3,136,810
CHLORINATED AROMATIC ESTERS
Jack S. Newcomer, Wilson, Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Filed July 19, 1961, Ser. No. 125,065
7 Claims. (Cl. 260—473)

This application is a continuation-in-part of SN 791,015, filed February 4, 1959, and now Patent No. 3,006,967 in the United States Patent Office.

This invention describes new and useful herbicidal halogenated aromatic esters and methods for their use.

More specifically, this invention relates to trichlorobenzyloxyalkyl esters of chlorinated aliphatic and phenoxyaliphatic acids and methods for employing them as herbicides, growth controllents, biological sterilants and the like. These novel compositions have the structure:

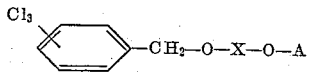

wherein X is an organic radical selected from the group consisting of alkylene, alkylene-oxy-alkylene, alkylene substituted by —OA, and alkylene substituted by —OH and said alkylene radicals having from two to six carbon atoms exclusive of any A group, and A is an organic radical chosen from the group consisting of 2,4-dichlorophenoxyacetyl, 2,4,5-trichlorophenoxyacetyl and 2-(2,4,5-trichlorophenoxy)propionyl.

Examples of compounds included in this invention include, but are not limited to the following named or illustrated compounds: trichlorobenzyloxyethyl 2,4-dichlorophenoxyacetate, trichlorobenzyloxyethyl - 2,4,5-trichlorophenoxyacetate, trichlorobenzyloxyethyl-2-(2,4,5-trichlorophenoxy)propionate, 2-(trichlorobenzyloxy)propyl 2,4-dichlorophenoxyacetate, 2-(trichlorobenzyloxy)propyl 2,4,5-trichlorophenoxyacetate, 2-(trichlorobenzyloxy)propyl - 2 - (2,4,5 - trichlorophenoxy)propionate, 1-(trichlorobenzyloxy)-2-propyl 2,4 - dichlorophenoxyacetate, 1-(trichlorobenzyloxy) - 2 - propyl-2,4,5-trichlorophenoxyacetate, 1 - (trichlorobenzyloxy)-2-propyl-2-(2,4,5-trichlorophenoxy)propionate, 2-(trichlorobenzyloxy)-1-butyl 2,4-dichlorophenoxyacetate, 2 - (trichlorobenzyloxy)-1-butyl 2,4,5-trichlorophenoxyacetate, 2 - (trichlorobenzyloxy)-1-butyl-2-(2,4,5-trichlorophenoxy)propionate, 3-(trichlorobenzyloxy) - 1 - butyl 2,4-dichlorophenoxyacetate, 3-(trichlorobenzyloxy)-1-butyl 2,4,5 - trichlorophenoxyacetate, 3-(trichlorobenzyloxy) - 1 - butyl-2-(2,4,5-trichlorophenoxy)propionate, 4 - (trichlorobenzyloxy)-1-butyl 2,4,5-trichlorophenoxyacetate, 4 - (trichlorobenzyloxy)-1-butyl-2-(2,4,5 - trichlorophenoxy)propionate, trichlorobenzyloxyethoxyethyl 2,4-dichlorophenoxyacetate, trichlorobenzyloxyethoxyethyl 2,4,5 - trichlorophenoxyacetate, trichlorobenzyloxyethoxyethyl 2-(2,4,5-trichlorophenoxy) propionate, trichlorobenzyloxypropoxypropyl 2,4-dichlorophenoxy, trichlorobenzyloxypropoxypropyl 2,4,5 - trichlorophenoxy acetate, trichlorobenzyloxypropoxypropyl-2-(2,4,5-trichlorophenoxy)propionate; 3-trichlorobenzyloxy-2-hydroxy-1-propyl 2,4-dichlorophenoxy, 3-trichlorobenzyloxy-2-hydroxy-1-propyl-2,4,5-trichlorophenoxyacetate, 3-trichlorobenzyloxy-2-hydroxy-1-propyl-2-(2,4,5 - trichlorophenoxy)propionate, 3 - trichlorobenzyloxy-1,2-propylene bis-2,4-dichlorophenoxyacetate, 3-trichlorobenzyloxy-1,2-propylene bis-2,4,5-trichlorophenoxyacetate, 3-trichlorobenzyloxy-1,2-propylene bis-2-(2,4,5-trichlorophenoxyacetate), as well as the following compositions which, because of the difficulty in concisely naming them are shown structurally:

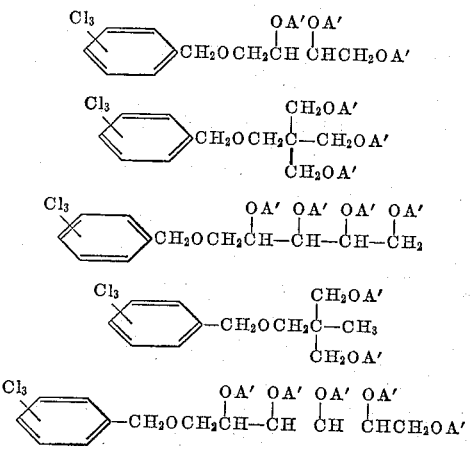

wherein A' is an organic radical selected from the group consisting of hydrogen and 2,4-dichlorophenoxyacetyl-2,4,5 - trichlorophenoxyacetyl, or 2-(2,4,5-trichlorophenoxy)propionyl, at least one A' being 2,4-dichlorophenoxyacetyl, 2,4,5-trichlorophenoxyacetyl, or 2-(2,4,5-trichlorophenoxy)propionyl.

The term trichlorobenzyloxy group named or illustrated is defined as including the 2,3,4-, 2,3,5-, 2,3,6-, 2,4,5-, 2,4,6- and 3,4,5-trichloro configurations or a mixture of one or more of these.

While all of the named and illustrated compositions of this invention are effective herbicides as in any broad and large group of compounds, for various reasons, there will be a preferred group or sub-group. In this instance, because of their high activity, lower cost of production, and method of production used, the preferred group of compositions are those having the 2,3,6-configuration. Similarly, because the crude reaction products of this invention are a mixture of the various isomers including the highly active 2,3,6-trichlorobenzyloxy compositions, a preferred sub-group of compositions are the compositions rich in 2,3,6-trichlorobenzyloxy isomers or more precisely, those isomer mixtures having at least a thirty percent 2,3,6-trichlorobenzyloxy isomer concentration.

The compositions of this invention are viscous high-boiling liquids or low melting solids, insoluble or slightly soluble in water and soluble in most organic solvents. These products are made in essentially quantitative yield by esterifying the trichlorobenzyloxyalkanols whose preparation is disclosed in copending application SN 791,015, and, now Patent No. 3,006,967. The esterification conditions are to heat the trichlorobenzyloxyalkanol with the acid, i.e., 2,4-dichlorophenoxyacetate, 2,4,5-trichlorophenoxyacetic, 2-(2,4,5-trichlorophenoxy)propionic acid until the ester is formed, and removing the water formed during the esterification by azeotropic distillation with an appropriate inert solvent such as benzene or an alkylbenzene. A few tenths of a percent or more of an acid catalyst, such as sulfuric acid, is advantageous. The preparation of the preferred 2,3,6-trichloro- compositions or the preferred sub-group of mixtures containing at least thirty percent of the 2,3,6-trichloro configuration is given in the aforementioned parent case wherein the starting material is toluene or o-chlorotoluene. In addition, it has been found that good yields of the preferred isomeric compositions (having above thirty percent 2,3,6-trichlorobenzyloxy isomers) are obtained when 2,5-dichlorotoluene, 2,3-dichlorotoluene and 2,6-dichlorotoluene are used as the starting materials for the parent alcohols. Since the esterification does not change the isomeric configuration the esters in general have the same isomer composition as the parent compounds.

One of the major problems in weed control is lack of herbicides suitable for the low cost treatment of low value agricultural land, fencerows, vacant lots, highway shoulders, rights of way along railroad tracks and power lines, drainage ditches and canals, storage and manufacturing areas, parking areas, oil depots, switchyards, military installations and any other area where weed growth is objectionable. The herbicide used must offer low cost of initial application, coupled with long-term persistance to avoid the problem of regrowth and the cost and nuisance of repeated treatments. An ancillary problem involved is that all sorts of weeds, annual and perennial, broadleaf (dicotyledonous) and narrow leaf or grassy (monocotyledonous) are encountered. Thus, in addition to being low in cost, and having long term persistance, the herbicide to be truly useful for such purposes as named above, would have to be active against the broad spectrum of weeds encountered under diverse conditions of soil and climate. While several commercially available herbicides would seem at first sight to be quite satisfactory, they have disadvantages which make their use impractical under the stringent conditions of this invention.

For example, three otherwise satisfactory herbicides from which these esters are derived, that is, 2,4-dichlorophenoxyacetic acid, 2,4,5-trichlorophenoxyacetic acid, and 2-(2,4,5-trichlorophenoxy)propionic acid (as well as their simple salts and esters), while useful generally as herbicides, have shortcomings that severely limit their usefulness for purposes such as those named above. For instance, all of the above acids, their salts, and their known esters, while effective against broadleaf or dicotyledonous weeds, are almost completely inactive against the aggressive grassy or monocotyledonous weeds such as Johnson grass, crabgrass, quackgrass and Bermuda grass. An additional shortcoming of these herbicides is their relatively low effectiveness against the more recalcitrant or resistant broadleaf weeds such as field bindweed, Canada thistle, Russian knapweed, puncture vine and the like. Against such weeds, these known herbicides are not satisfactory unless time consuming and expensive repeat applications of the herbicide are resorted to. This need for more than one application coupled with these herbicides rather short lived phytotoxicity after application makes them costly and unsatisfactory for the herbicidal purposes of this invention.

Based upon the foregoing, it is most surprising and unexpected to find that the compounds of this invention which are related to the above acid herbicides should possess favorable characteristics not found in the free acid themselves.

Thus, the herbicidal esters of this invention offer the advantages of effective low cost single application treatment against both grassy and broadleaf weeds including the grassy perennial broadleaf weeds, resistant to the aforementioned acids, their simple esters and salts. These characteristics coupled with long term persistance of their phytotoxic residues make the herbicidal esters of this invention a valuable and distinct step forward in the herbicidal art.

While a broad spectrum of activity against broad and narrow leaf weeds, low cost, single applications and long term phytotoxicity are the salient advantages of the herbicidal compositions of this invention there are other important and additional advantages, some of which will be disclosed for the sake of illustration.

An additional advantage of the novel herbicides of this invention is that they lend themselves to use in various states and grades of purity, ranging from the highly purified oil or crystalline products to techanical crudes. Furthermore, these herbicidal compositions offer the advantage of compatibility with a host of other herbicides including the tri- and tetra-chlorophenylacetic acids and the sodium borates and calcium borates, the herbicidal phenoxy aliphatic acids and esters, simazine and other herbicidal triazines, aminotriazole, monuron, fenuron, diuron and other herbicidal ureas, herbicidal pentroleum oils, hexachlorocyclopentadiene, pentachlorophenol, dinitro-o-alkylphenols, sodium trichloroacetate, ethylene glycol trichloroacetate, other trichloroacetate esters, 2,2-dichloropropionic acid and its esters and salts such as sodium 2,2-dichloropropionate. These combinations of herbicides frequently enhance, potentiate, synergize or otherwise advantageously extend the range, scope or effect of the herbicidal trichlorobenzyloxyalkanol esters of the invention. In addition to herbicides, fungicides such as the metal dimethyldithiocarbamates and ethylenebis-(dithiocarbamates), insecticides such as benzene hexachloride and chlordane, and fertilizers such as urea and ammonium nitrate, and various adjuvants and diluents well known to the art may be efficaceously combined with the inventive composition if desired. Thus, these herbicides may be used by themselves or made the subject of liquid or solid formulations ranging from the very simple to the most complex. For example, if it is desired, these compositions may be made the subject of a liquid formulation by diluting, dispersing, dissolving or emulsifying with a surfaceactive adjuvant or combination of these adjuvants in water or organic solvents such as petroleum hydrocarbons, alcohols, ketones, esters, glycols or combinations thereof. Or alternatively, the novel herbicides may be made up as solid formulations of powders, dusts, wettable dusts, granules and pellets using solid diluents such as talcs, clays, flours, starches, diatomaceous earths, mica, alkaline earth limes, vermiculite, borates, carbonates and phosphates either finely divided, granular or pelleted in form.

These solid and liquid formulations facilitate handling and application and sometimes markedly enhance the herbical activity of the active ingredient.

The liquid compositions, whether solutions or dispersions of the active agents in a liquid solvent and also the wettable powder or dust compositions of this invention may contain as a conditioning agent one or more surface active agents in amounts sufficient to render the composition readily dispersible in water. Under the term surface active agents are included wetting agents, dispersing agents, emulsifying agents and the like. A satisfactory but not complete list of such agents is set forth in an article in "Soap and Chemical Specialties," vol. 31, No. 7, pages 50–61; No. 8, pages 48–61; No. 9, pages 52–67, and No. 10, pages 38–67, 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply the herbicides of this invention to the weed population in post-emergence use or to the soil where weed growth is to be suppressed or prevented in pre-emergence use. The herbicides may be made up as a dust, spray or granulation containing one or more surface active agents and/or conditioning agents, the herbicide alone or in combination with one or more other herbicidal or biological toxicants with the necessary solid or liquid diluent(s) or carrier(s).

The rate of application cannot be precisely stated due to varying degrees of resistance possessed by the weed species, the stage of weed growth, the soil type and climatic conditions, but in general, the rates will be at least one-quarter of a pound of herbicide per acre and for reasons of cost, will seldom exceed one hundred pounds per acre, with the preferred range falling within one-half to fifty pounds per acre. Where the weeds are in an early stage of growth, and hence more susceptible, they will frequently respond to lower rates of application ranging from one-half to four pounds per acre, while older weeds, perennial weeds or resistant species may require rates in excess of four pounds per acre. In those instances where the weed population has been allowed to accumulate unchecked, or where mature plants are encountered, applications of up to fifty and even beyond this rate may be required. For eradication of deeply-rooted or herbicide-resistant perennial weeds such as various brush species or field bindweed, or for long term sterilization of the soil, rates of ten to more than one hundred pounds are often found to be necessary.

The following examples are intended to illustrate the workings of this invention including suh facets as the preparation of the herbicidal composition, their formulation as herbicidal agents, and the testing results obtained using representative compounds as herbicides. The details of certain embodiments either in the preceding specification or foregoing examples is not intended to place limitations upon the inventive method except as set forth in the claims.

EXAMPLE 1

This example shows the preparation and analysis of the alcohol or glycol reactant used to make the composition of this invention; the members of the X group in the above-shown general formula are indicated in the first column of the chart below.

Toluene was chlorinated at sixty to seventy degrees centigrade in the presence of 0.1 percent ferric chloride as a catalyst until the weight uptake indicated about 2.5 moles of chlorine had reacted per mole of toluene. The product was distilled and the fraction boiling at one hundred and twenty to one hundred and forty degrees centigrade (twenty min.), was taken. Analysis by infrared indicated an isomer content of twenty-five to forty percent 2,4,5- forty to fifty percent 2,3,6-, and ten to fifteen percent 2,3,4-trichlorotoluene, and smaller amounts of 2,4,6- and other isomers. This trichlorotoluene was chlorinated at one hundred to two hundred degrees centigrade under irradiation by a mercury vapor lamp until 0.7 to 0.8 mole of hydrogen chloride per mole of trichlorotoluene was evolved. This product was fractionated to obtain the trichlorobenzyl chloride fraction, boiling point one hundred and thirty-one to one hundred and fifty-two degrees centigrade (six mm.). This trichlorobenzyl chloride was added with stirring to 1.5 mole equivalents of caustic soda in a molar excess of the chosen glycol, at one hundred and forty to one hundred and fifty degrees centigrade, and the reaction mixture heated and stirred for about three hours. The mixture was then poured into water, exhaustively extracted with toluene, and the toluene extracts combined and distilled under reduced pressure to obtain the desired product. Infrared analysis shows these products to have substantially the same isomer distribution as the trichlorotoluene intermediate.

EXAMPLE 2

*Preparation of 2-(2,3,6-Trichlorobenzyloxy)Ethanol*

2,3,6-trichlorotoluene prepared by the method of Brimelow, Jones and Metcalf (J. Chem. Soc. 1951, 1208), is chlorinated at one hundred to one hundred and twenty degrees centigrade, under irradiation by a mercury vapor lamp until 0.7 to 0.8 mole of hydrogen chloride per mole of the toluene is evolved. The resultant 2,3,6-trichlorobenzyl chloride, boiling point one hundred and fifty to one hundred and fifty-five degrees centigrade (eighteen mm.), is separated from unreacted 2,3,6-trichlorotoluene by fractionation. A solution of forty-four parts of caustic soda in two hundred and fifty parts of ethylene glycol is prepared by warming to one hundred and eighty-five degrees centigrade, then cooled to one hundred and forty-five degrees centigrade, and one hundred and fifteen parts of 2,3,6-trichlorobenzyl chloride is added. After three hours at one hundred and forty-five to one hundred and fifty degrees centigrade, the reaction mixture is mixed with two thousand parts of water and one thousand parts of toluene; the toluene layer then separated and fractionated, yielding sixty-five parts of 2-(2,3,6-trichlorobenzyloxy)ethanol, boiling point one hundred and eighty-one to one hundred and ninety-two degrees centigrade (six mm.).

*Analysis.*—Calcd. for $C_9H_9Cl_3O_2$: Cl, 41.6 percent. Found: Cl, 41.2 percent.

EXAMPLE 3

By the method of the foregoing example, 2,3,6-trichlorobenzyl chloride is reacted with propylene glycol to obtain a colorless liquid boiling point one hundred and eight degrees centigrade (0.05 mm. in short-path still).

*Analysis.*—Calcd. for $C_{10}H_{11}Cl_3O_2$: Cl, 39.5 percent. Found: Cl, 39.2 percent.

EXAMPLE 4

*Preparation of the 2,4-Dichlorophenoxyacetate of Trichlorobenzyloxyethanol*

A trichlorobenzyloxyethanol from Example 1 is admixed with one molar equivalent of 2,4-dichlorophenoxyacetic acid plus one part by weight of toluene per part of alcohol and refluxed in a suitable reaction vessel fitted with a continuous decanter in the reflux line, continually separating the co-distilled water until no further evolution of water occurs. The reaction mixture is then fractionally distilled to yield a substantially quantitative yield of the 2,4-dichlorophenoxyacetate of trichlorobenzyloxyethanol. Infrared analysis indicates that the isomeric distribution is twenty-five to forty percent 2,4,5-, forty to fifty percent 2,3,6-, and ten to fifteen percent 2,3,4-trichlorobenzyloxyethyl 2,4-dichlorophenoxyacetate.

*Analysis.*—Calcd. for $C_{11}H_6O_3Cl_6$: Cl, 53.0 percent. Found: Cl, 53.0 percent.

EXAMPLE 5

*Preparation of Other Trichlorobenzyloxyalkanol Esters*

Using the procedure and equipment of Example 4, and the indicated trichlorobenzyloxyalkanol of Example

| Composition No. | Group —X— | Glycol Employed | Description Of Product | Analysis, Cl Calcd. | Cl Found |
|---|---|---|---|---|---|
| 1 | $-CH_2CH_2-$ | Ethylene glycol | Semi-solid, b.p. 181–192° C. (6 mm.) | 41.6 | 41.2 |
| 2 | $-CH_2CH_2CH_2CH_2-$ | 1,4-butanediol | Viscous syrup, b.p. 140–168° C. (0.25 mm.) | 37.6 | 37.3 |
| 3 | $-CH_2CH(CH_2)-$ | 1,2-propanediol | Viscous syrup, b.p. 140–168° C. (0.5 mm.) | 39.5 | 37.9 |
| 4 | $-CH_2CHOHCH_2-$ | Glycerol | Very viscous syrup decomp. on dist. | 37.5 | 39.3 |
| 5 | $-CH_2CH_2OCH_2CH_2-$ | Diethylene glycol | Viscous syrup, b.p. 175–185° C (0.05 mm.) | 35.5 | 34.0 |
| 6 | $-CHCH(CH_3)OCH_2CH(CH_3)-$ | Dipropylene glycol | Viscous syrup, b.p. 180–185° C (0.05 mm.) | 32.5 | 32.7 |
| 7 | $-CH(CH_3)CHCH(CH_3)-$ | 2,3-butanediol | Viscous syrup, b.p. 170–176° C (5 mm.) | 37.7 | 38.0 |
| 8 | $-CH_2CH_2CH(CH_3)-$ | 1,3-butanediol | Viscous syrup, b.p. 171–182° C (5 mm.) | 37.7 | 37.3 |
| 9 | $-(CH_2CH_2O)_2CH_2CH_2-$ | Triethylene glycol | Viscous syrup, b.p. 210–250° C (0.38 mm.) | 31.0 | 28.8 |
| 10 | $-CH_2CH_2-$* | Ethylene glycol | Semi-solid, b.p. 175–190° C. (5 mm.) | 41.6 | 41.0 |
| 11 | $-CH_2CH(CH_3)-$* | 1,2-propane diol | Viscous semi-solid, b.p. 145–160° C. (0.5 mm.) | 39.5 | 39.0 |

* Prepared starting with orthochlorotoluene (infrared analysis shows sixty to seventy percent 2,3,6-isomer and thirty to forty percent 2,4,5-isomer in the trichlorotoluene intermediate and the finished product).

1 with the indicated acid, the following ester products are prepared.

| Composition Number | Acid Reactant | Analysis of the ester | | Physical Description of the Ester |
|---|---|---|---|---|
| | | Percent Cl Calcd. | Percent Cl Found | |
| Composition 10 | 2,4-dichlorophenoxyacetic acid. | 38.8 | 38.0 | Viscous syrup. |
| Composition 3 | ___do___ | 37.6 | 37.7 | Do. |
| Composition 4 | 2,4-dichlorophenoxyacetic acid (1 mole). | 36.3 | 35.5 | Do. |
| Composition 1 | 2,4,5-trichlorophenylacetic acid. | 43.1 | 43.0 | Do. |
| Composition 3 | ___do___ | 42.0 | 42.5 | Do. |
| Composition 10 | ___do___ | 43.1 | 43.6 | Do. |
| Composition 1 | 2-(2,4,5-trichlorophenoxy)propionic. | 42.0 | 41.9 | Do. |
| Composition 3 | ___do___ | 40.9 | 40.5 | Do. |
| Composition 5 | ___do___ | 38.7 | 37.9 | Do. |

EXAMPLE 6

Nine different emulsifiable herbicidal oil formulations are made by blending the following ingredients: each emulsion contains as its active herbicidal component a single different product from Example 5.

Parts by weight
An ester product from Example 5 ---------------- 1
High aromatic naphtha ------------------------- 1.9
Emulsifier (alkylaryl sulfonate - polyoxyethylene blend) ------------------------------------- 0.1

EXAMPLE 7

Nine different herbicidal oil spray formulations are made by blending a different herbicidal ester of Example 5 with the following inert ingredients.

Parts by weight
An ester from Example 5 ---------------------- 1
Diesel oil ----------------------------------- 99

This spray produced one hundred percent kill of Johnson grass when sprayed at the rate of fifty gallons per acre.

EXAMPLE 8

A five percent granular formulation was produced by spraying one part by weight of a melt of 2,3,6-trichlorobenzyloxypropyl 2,4-dichlorophenylacetate at one hundred degrees centigrade onto nineteen parts by weight of granular attapulgus clay, while tumbling the clay in a rotating drum heated at one hundred degrees centigrade, then cooling the granules. Free-flowing granules were obtained.

EXAMPLE 9

An area infested with a mixed population of broadleaf perennial weeds including wild carrot, Canada thistle, field bindweed, hedge bindweed, and plantain, plus a mixed population of perennial grasses including quackgrass and bluegrass was divided into plots, which were sprayed with the various ester products of this invention, using other herbicidal chemicals for comparison purposes at the rates of ten and forty pounds per acre. Other plots were left untreated as controls. One year later, the treated area was inspected and the repression of weed population noted relative to the control areas. The table on the next pages gives the tabulated data.

TABLE

| Chemical Tested | Derived From Example— | Estimated Percent Reduction In Weed Populace Relative To Control Areas | | | |
|---|---|---|---|---|---|
| | | Broadleaf Weeds | | Grassy Weeds | |
| | | At 10 Lbs./Acre | At 40 Lbs./Acre | At 10 Lbs./Acre | 40 Lbs./Acre |
| Trichlorobenzyloxyethyl 2,4-dichlorophenylacetate. | 1, Comp. 1 | 70–80 | 100 | 60–70 | 100 |
| Trichlorobenzyloxyethyl 2,4,5-trichlorophenylacetate. | 1, Comp. 1 | 70–80 | 100 | 50–60 | 100 |
| Trichlorobenzyloxyethyl-2-(2,4,5-trichlorophenyl)propionate. | 1, Comp. 10 | 80–90 | 100 | 70–80 | 100 |
| Trichlorobenzyloxypropyl 2,4-dichlorophenylacetate. | 1, Comp. 3 | 70–80 | 100 | 65–75 | 100 |
| 2,3,6-(2,4,5-trichlorophenyl)propionate trichlorobenzyloxypropyl 2,4-dichlorophenylacetate. | 2 | 80–85 | 100 | 55–65 | 100 |
| Trichlorobenzyloxypropyl 2,4,5-trichlorophenylacetate. | 1, Comp. 3 | 60–70 | 100 | 55–65 | 100 |
| 2,3,6-trichlorobenzyloxypropyl 2,4,5-trichlorophenylacetate. | 2 | 65–75 | 100 | 60–70 | 100 |
| 2,4-dichlorophenoxyacetic acid | | 10–20 | 25–35 | *0 | *0 |
| 2,4,5-trichlorophenoxyacetic acid | | 10–20 | 35–45 | *0 | *0 |
| 2-(2,4,5-trichlorophenoxy)propionic acid | | 10–20 | 50–60 | *0 | *0 |
| 2,4-dichlorophenoxyacetic acid butoxyethyl ester. | | 10–20 | 25–35 | *0 | *0 |
| 2,4,5-trichlorophenoxyacetic acid butoxyethyl ester. | | 10–20 | 30–40 | *0 | *0 |
| 2,4,5-trichlorobenzyloxyethyl 2,4-dichlorophenoxyacetate. | | 20–30 | 60–70 | 10 | 20–30 |

*Seemingly accelerates the growth of the grassy weeds, apparently due to the reduction of competing broadleaf weeds.

EXAMPLE 10

An area infested with crabgrass (*Digitaria sanguinalis*) and ragweed (*Ambrosia artemisiifolia*), was treated in the early Spring with two pounds per acre of 2,3,6-trichlorobenzyloxypropyl 2,4-dichlorophenylacetate. During the following summer, substantially complete control of the indicated species was obtained. By contrast, treatment of adjacent areas with 2,4-D (as butoxyethyl ester), gave no crabgrass control, and only transitory ragweed control (several weeks).

Similar favorable results were obtained with 2,3,6-trichlorobenzyloxypropyl 2,4,5-trichlorophenylacetate and 2,3,6 - trichlorobenzyloxypropyl 2(2,4,5 - trichlorophenyl) propionate, and with isomer mixtures of these esters comprising about sixty to seventy percent of the 2,3,6-isomer and thirty to forty percent of the 2,4,5- isomer.

EXAMPLE 11

A strip of soil under a highway guard rail was sprayed at the rate of one hundred pounds per acre with a mixture having the approximate composition (by infrared analysis): 40–50 percent 2,3,6-trichlorobenzyloxypropyl 2,4- dichlorophenylacetate, 25–40 percent 2,4,5-trichlorobenzyloxypropyl 2,4-dichlorophenylacetate, 10–15 percent 2,3,4-trichlorobenzyloxypropyl 2,4-dichlorophenylacetate, plus a few percent 2,4,6-trichlorobenzyloxypropyl 2,4-dichlorophenylacetate, plus traces of other isomers. Almost one hundred percent control of all weed growth was observed for two years following the application. In nearby untreated areas, plantain, chicory, quackgrass, poison ivy, teazel, dandelion, and foxtail were growing in a heavy stand.

Adjacent areas treated with 2,4,5-T "low volatile ester" (butoxyethyl 2,4,5-trichlorophenoxyacetate), at a similar rate showed good temporary control of plantain, chicory, poison ivy, teazel, and dandelion, this control lasting however only for part of one growing season, and only negligible control of the other species named.

We claim:
1. A compound of the formula:

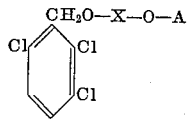

wherein X is a radical selected from the group consisting of alkylene, alkylene-oxy-alkylene, alkylene substituted by —OA, alkylene substituted by —OH, and mixtures thereof, each of said alkylene radicals having from two to six carbon atoms, exclusive of any A group, and where A is a radical selected from the group consisting of 2,4-dichlorophenoxyacetyl, 2,4,5-trichlorophenoxyacetyl, 2-(2,4,5-trichlorophenoxy)propionyl, and mixtures thereof.

2. 2,3,6-trichlorobenzyloxyethyl 2,4-dichlorophenoxyacetate.

3. 2,3,6 - trichlorobenzyloxyethyl 2,4,5 - trichlorophenoxyacetate.

4. 2,3,6 - trichlorobenzyloxyethyl 2 - (2,4,5 - trichlorophenoxy)propionate.

5. 2 - (2,3,6 - trichlorobenzyloxy)propyl 2,4 - dichlorophenoxyacetate.

6. 2 - (2,3,6 - trichlorobenzyloxy)propyl 2,4,5 - trichlorophenoxyacetate.

7. 2 - (2,3,6 - trichlorobenzyloxy)propyl 2 - (2,4,5 - trichlorophenoxy)propionate.

References Cited in the file of this patent
UNITED STATES PATENTS

| | | |
|---|---|---|
| 2,523,188 | Britton et al. | Sept. 19, 1950 |
| 2,765,224 | Lambrech | Oct. 2, 1956 |
| 3,006,967 | Newcomer et al. | Oct. 31, 1961 |

OTHER REFERENCES

Freudenberg et al.: Ber. Deut. Chem., 74B, 1400–6 (1941).